Figure 1:
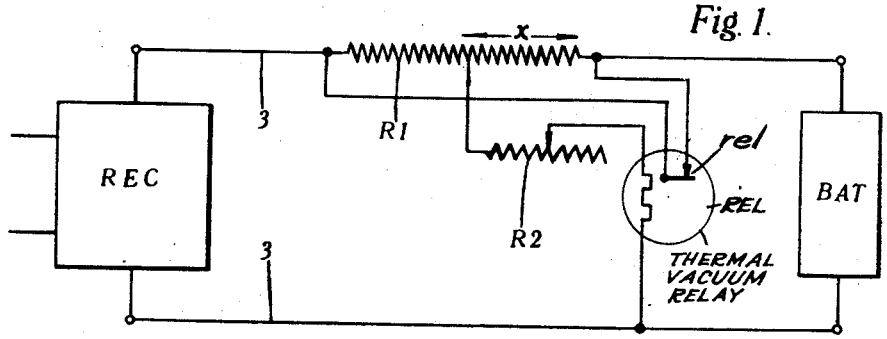

Nov. 18, 1941.  G. C. HARTLEY ET AL  2,262,845
REGULATION OF ELECTRIC SUPPLY CIRCUITS
Filed June 21, 1939   2 Sheets-Sheet 2

Inventors
G.C. Hartley
E.A. Richards
by
Attorney

Patented Nov. 18, 1941

2,262,845

UNITED STATES PATENT OFFICE 2,262,845

REGULATION OF ELECTRIC SUPPLY CIRCUITS

George Clifford Hartley and Edward Arthur Richards, London, England, assignor to International Standard Electric Corporation, New York, N. Y.

Application June 21, 1939, Serial No. 280,310
In Great Britain June 21, 1938

6 Claims. (Cl. 171—314)

This invention concerns a device for regulating the voltage of an electric source of supply and especially concerns a device for regulating the voltage of a secondary battery which is being subjected to automatic charging.

During automatic charging a battery is charged at a certain rate until the required voltage is attained, after which it is charged at a very much slower rate, i. e. trickle charged, until the voltage falls to a predetermined figure, whereupon it is again full charged for a period until the maximum voltage is again attained.

According to the invention there is provided a device for regulating the voltage of an electric supply source undergoing automatic charging comprising a thermally operated relay connected across the source of supply and arranged upon operation to insert into the external circuit of the source of supply a device adapted to control the current flowing to the supply source.

In one embodiment of the invention there is provided a device for regulating the voltage of a secondary battery comprising a hot wire vacuum relay connected across the battery and arranged upon operation to insert a control device in the form of a resistance into the charging circuit of the battery. The hot wire vacuum relay comprises a pair of contacts either normally open or normally closed, the operation of which is controlled by the expansion of a heater element or filament through which the control current is passed. The operated gap of the contacts is, of course, extremely small but through working in a vacuum they are able to handle currents of the magnitude of 10 amperes with substantially non-reactive loads. For automatic battery charging the utility of the relay is largely due to the fact that it has reliable and consistent voltage characteristics. Preferably the relay is arranged upon operation to increase the current flowing through its own heater whereby the relay is prevented from releasing until the voltage of the supply source has fallen by a predetermined amount. In this manner the relay may be arranged to remain operated between certain predetermined voltage limits. In certain cases e. g. due to current failure the voltage of the supply source may fall below the predetermined lower voltage limit in which case it is desirable to charge the supply source above the normal maximum figure. In order to effect this result a second relay e. g. another thermally operated relay may be connected across the source of supply and arranged to operate at a higher voltage and to release at a lower voltage than the first relay in order that if the voltage of the source falls below the normal lower limit the full current is maintained until a higher upper voltage limit is reached.

Figure 2:
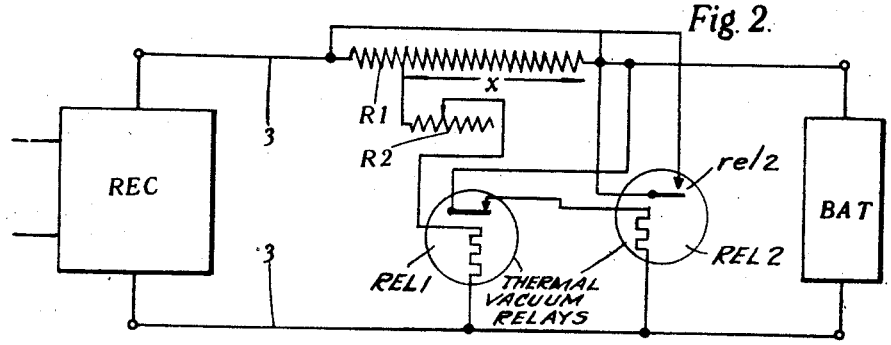
Figure 3:
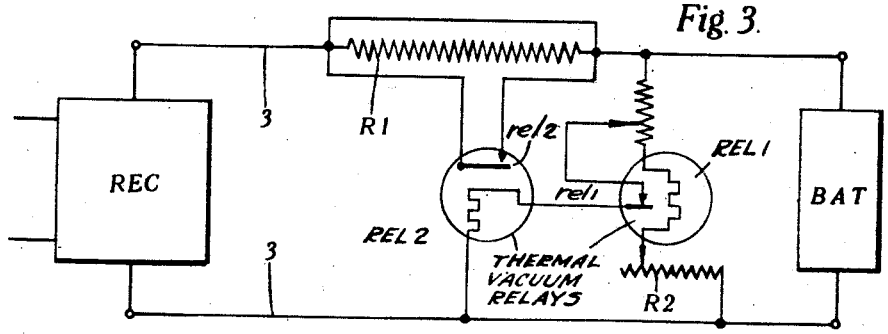
Figure 4:
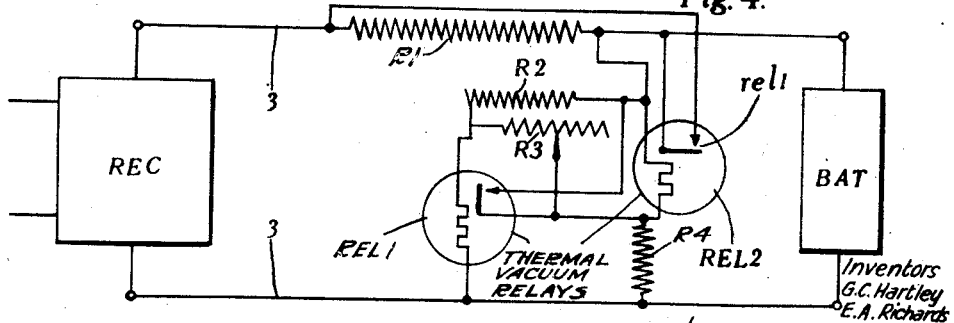
Figure 5:
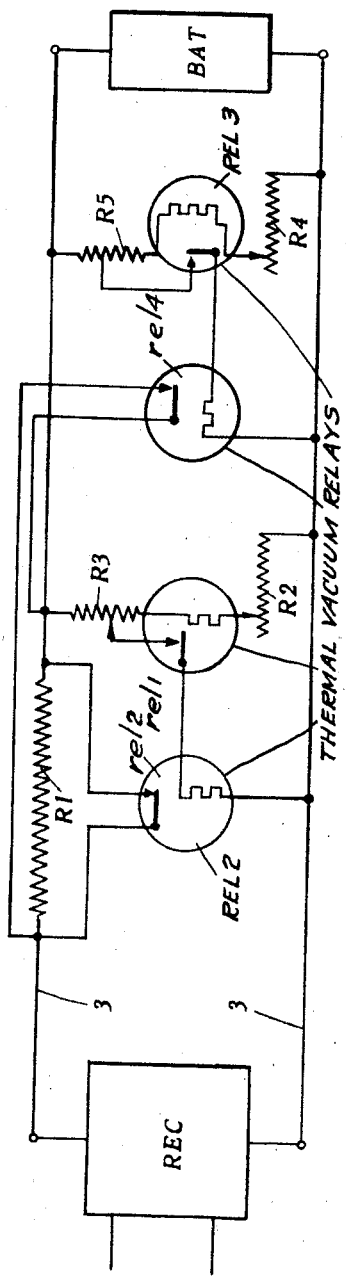
Figure 6:
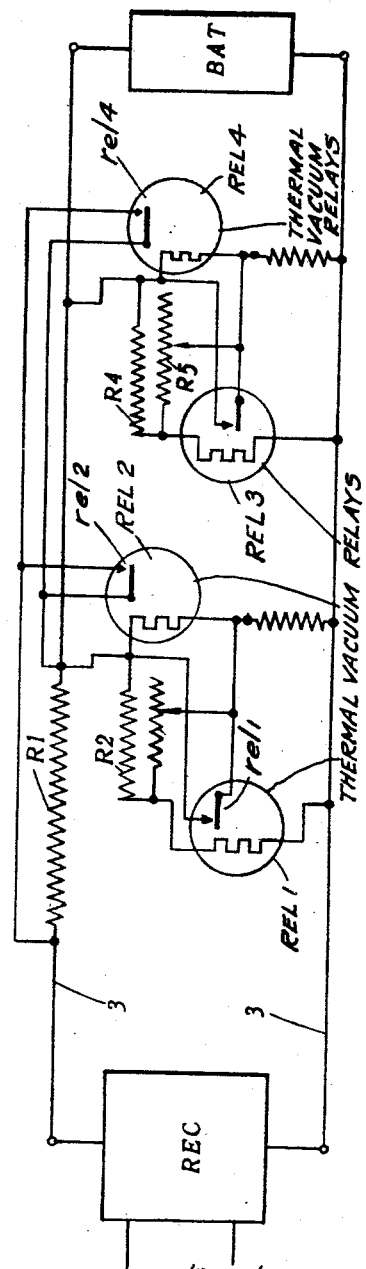

In order that the invention may be clearly understood and readily carried into effect reference is directed to the accompanying drawings, in which Figs. 1 and 2 show simplified circuits for controlling the charging of a battery; Figs. 3 and 4 show a modification of the battery charging arrangement having a more flexible control of the charging control range, and Figs. 5 and 6 show modified arrangements for permitting control of the charging rate for a lower limit of discharge voltage to care for temporary power failures.

Figs. 1 and 2 show two alternative circuit diagrams for an embodiment of the invention particularly for use in controlling the charging of a galvanic battery. In Fig. 1 charging current for the battery BAT is supplied by a rectifier REC over the circuit 3. A hot wire vacuum relay REL is connected across the battery BAT, and the contacts rel of this relay are normally made before operation of the relay and are employed to short circuit a control resistance $R_1$ in the circuit 3 to allow charging to proceed at the full rate. The relay REL is connected in series with a rheostat $R_2$ from a tapping on the resistance $R_1$ to the other side of the battery BAT. The relay REL plus the resistance $R_2$ therefore receive substantially the full battery voltage, $R_1$ being a low resistance compared with $R_2$ and the relay REL.

When the required maximum voltage is attained the relay REL operates and breaks the normally made contacts rel thus inserting the resistance $R_1$ into the circuit 3; this cuts down the full charge to what is known as the trickle charge current. The rheostat $R_2$ provides a means of adjusting the voltage at which the relay REL will operate. It will be noted that after operation of the relay REL an additional voltage is developed across the portion of the control resistance $R_1$ marked X, this ensures that the battery voltage must fall by a definite amount before the effective voltage across the relay REL allows it to release and remake the contacts 1 and 2. The value of X therefore determines the minimum voltage at which the relay REL will remain operated or the band width over which it will remain operated. As an example, it may be mentioned that on a 50 volt battery a 3 volt fall may be permitted before release of the relay REL.

The circuit shown in Fig. 2 is in principle the same as that shown in Fig. 1, but owing to the fact that normally made contacts are rather less reliable than normally open contacts when dealing with heavy currents (e. g. up to 10 amperes at 240 mains volts). Fig. 2 shows REL1 with normally made contacts rel1 controlling REL2 with normally open contacts rel2. During charging REL2 is operated so that its contacts rel2 are made short circuiting the resistance R₁. When the voltage of the battery BAT reaches the desired value the relay REL1 is operated breaking the contacts rel1, thus disconnecting the relay REL2 and breaking its contacts rel2, whereupon the circuit is in condition for trickle charging.

In the above two circuit arrangements what has been referred to as the "band width" over which trickle charging condition is maintained is determined by factors including the trickle charge current and is in consequence dependent in a measure on the main supply voltage. Furthermore, this dependence on the rectifier output as a factor in the adjustment of the equipment makes it impossible or at least very difficult to adjust the device independently of the rectifier and battery. The consequent adjustment on the site is apt to be tedious owing to the need of waiting for the rise and fall of the battery voltage.

In view of the above considerations Figs. 3 and 4 show circuit arrangements in which the control of the "band width" is independent of the trickle charge current. In Fig. 3 relay REL2 controls the insertion of the trickle charge resistance in the circuit 3 while relay REL1 controls relay REL2. Relay REL1 is connected across the battery in series with an adjusting rheostat R₂ to determine the point of its operation, i. e. maximum volts, while R₃ with its slider, enables relay REL2 to give any required degree of shunting effect on REL1, so that when REL1 operates, it increases the amount of current flowing through its own heater and will thus remain operated until the battery volts have fallen to a predetermined minimum. In this way the maximum and minimum volts are thus purely dependent on the battery voltage and the device is independent for its performance and adjustment of the rectifier characteristics.

Fig. 4 shows a circuit for achieving a similar result to that achieved by the circuit shown in Fig. 3, but in the Fig. 4 circuit normally open contacts only are employed. Relay REL2 is again normally operated and short circuits the trickle charge resistance R₁. Relay REL1 is adjusted primarily by the series resistance R₂, but its current is slightly reduced by the shunting effect of R₃ and R₄, the latter being relatively small compared with the relay resistance. When REL1 makes its contacts it short circuits relay REL2 and REL1 now instead of being shunted by R₃, receives via R₃ a slight additional current. Thus again the adjustment of R₃ enables the band width to be determined.

It should be noted that in the two latter applications the operation and release of the controlling relay is dependent only on the voltage of the battery. The operation of the relay may therefore control the voltage by means other than the insertion of series resistance into a charging circuit. It might for instance control the insertion of a control device in the form of a counter C. M. F. cell.

If for any reason the power supply should fail however, the battery BAT may continue to discharge below the lower voltage limit at which the relay or relays change over their contacts to full charge position. In such circumstances it becomes desirable to recharge above the normal upper voltage limit when the power supply is restored in order to replace the nergy which has been taken from the battery during the period when the power supply was not available. This may be effected by duplicating the relay arrangement but setting the second relay or pair of relays to operate and release at wider limits than the first so that the second relay only becomes effective when the voltage falls below the normal lower limit and thereafter maintains the full charging current until the abnormal upper limit is reached.

Fig. 5 shows an example applied to the arrangement described above in connection with Fig. 3. In the Fig. 5, REL1 and REL2 are the relays which normally control the voltage between two limits, for example 48–52 volts. REL3 and REL4 form a precisely similar arrangement but set to wider limits, for example 46–56 volts.

Suppose there has been a failure of the power supply and the battery has been discharged to a value below 46 volts. Under these conditions both REL1 and REL3 will be released, and consequently REL2 and REL4 will be energised and their contacts rel2 and rel4 will be closed. When the power supply is restored the charging current will flow into the battery, and when the voltage has risen to 52 volts REL1 will be energised and will release REL2. The charging current will, however, still be maintained through the contacts rel4 of REL4. When the voltage has risen to 56 volts REL3 will be energised and will release REL4 which will open its contacts and reduce the current to a trickle charge. REL3 will remain energised as long as the voltage does not fall to 46 volts, i. e., as long as there is no power supply failure, because this is the only condition under which the battery can be discharged below 48 volts. The necessary conditions are thus fulfilled.

Fig. 6 is a similar arrangement applied to Fig. 4 described above. A second pair of relays REL3 and REL4 are arranged in a circuit similar to REL1 and REL2, respectively. However, the operating points are adjusted on these second relays so that they respond to a wider voltage range than relays REL1 and REL2.

Having now particularly described and ascertained the nature of our said invention and in what manner the same is to be performed, we declare that what we claim is:

1. A device for regulating the voltage of a secondary battery undergoing automatic charging comprising a thermally operated relay connected across the battery arranged to operate when the voltage of the battery rises to a predetermined figure, a control device, means responsive to operation of said relay for inserting said control device into the external circuit of the battery, means responsive to said insertion to increase the current flowing through the heater of said relay whereby the relay is prevented from releasing until the voltage of the supply source has fallen by a predetermined amount and an auxiliary relay connected across the battery arranged to operate at a higher voltage and to release at a lower voltage than the first relay for further controlling insertion of said control device in order that if the voltage of the source falls below the normal lower limit the full current is maintained until a higher upper voltage limit is reached.

2. A device according to claim 1 characterised in this that the auxiliary relay is thermally operated.

3. A device according to claim 1 further comprising normally closed contacts for said first relay, a second relay with normally closed contacts for controlling the operation of the first relay and a third relay for similarly controlling the auxiliary relay to operate at wider voltage limits than the first mentioned relay.

4. A device for regulating the voltage of a secondary battery undergoing automatic charging, comprising a source of supply voltage for supplying charging current to said battery, a circuit interconnecting said source and said battery, controlling means operatively associated with said circuit for controlling said charging current, a thermally operated relay connected across said circuit, operative under control of the charge condition of said battery to insert said controlling means in said circuit, normally closed contacts for said relay, a second thermally operated relay with normally closed contacts to control the operation of said relay first mentioned, a series resistance connected to said first mentioned relay and a slider in series with said second relay contacting said series resistance, the connection and arrangement of these elements being such that upon operation of said first mentioned relay the current flowing through its heater is increased whereby release of said relay is prevented until the voltage of said battery has fallen by a predetermined amount.

5. A device for regulating the voltage of a secondary battery according to claim 4, wherein said control means comprises a control resistance in said circuit, means controlled by said relay to short circuit said resistance when the voltage of the battery falls below a certain predetermined minimum figure and to remove said short circuit when the voltage of the source attains a certain predetermined maximum figure.

6. A device for regulating the voltage of a secondary battery undergoing automatic charging characterized by a hot wire vacuum relay connected across the secondary battery, the relay being released and its contacts being closed to form a part of the charging circuit when the voltage of the battery is below a certain predetermined figure, means for causing said relay to operate and its contacts to be broken when the voltage of the battery reaches a certain predetermined maximum figure and a control resistance, short circuited by said contacts when closed, in said charging circuit, said control resistance being provided with tappings to which the lead from the relay may be connected in order that an additional voltage may be developed across a part of the resistance after operation of the relay.

GEORGE CLIFFORD HARTLEY.
EDWARD ARTHUR RICHARDS.